(12) United States Patent
Woodfield et al.

(10) Patent No.: US 7,410,610 B2
(45) Date of Patent: *Aug. 12, 2008

(54) METHOD FOR PRODUCING A TITANIUM METALLIC COMPOSITION HAVING TITANIUM BORIDE PARTICLES DISPERSED THEREIN

(75) Inventors: Andrew Philip Woodfield, Cincinnati, OH (US); Eric Allen Ott, Cincinnati, OH (US); Clifford Earl Shamblen, Cincinnati, OH (US); Michael Francis Xavier Gigliotti, Scotia, NY (US); David Alan Utah, Cincinnati, OH (US); Alan Glen Turner, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 524 days.

This patent is subject to a terminal disclaimer.

(21) Appl. No.: 10/987,887

(22) Filed: Nov. 12, 2004

(65) Prior Publication Data

US 2006/0057017 A1    Mar. 16, 2006

Related U.S. Application Data

(63) Continuation-in-part of application No. 10/847,599, filed on May 17, 2004, which is a continuation-in-part of application No. 10/172,217, filed on Jun. 14, 2002, now Pat. No. 6,737,017, and a continuation-in-part of application No. 10/172,218, filed on Jun. 14, 2002, now Pat. No. 7,329,381, and a continuation-in-part of application No. 10/329,143, filed on Dec. 23, 2002, now Pat. No. 7,037,463, and a continuation-in-part of application No. 10/350,968, filed on Jan. 22, 2003, now Pat. No. 6,921,510, and a continuation-in-part of application No. 10/371,743, filed on Feb. 19, 2003.

(51) Int. Cl.
*B22F 3/00* (2006.01)
*B22F 9/18* (2006.01)

(52) U.S. Cl. .............................. 419/34; 419/41; 419/48; 419/49

(58) Field of Classification Search .................... 419/12, 419/19, 20, 41, 48, 49, 34
See application file for complete search history.

(56) References Cited

U.S. PATENT DOCUMENTS

| | | | |
|---|---|---|---|
| 2,799,570 A | 7/1957 | Reed et al. | |
| 2,828,199 A | 3/1958 | Findley | |
| 3,052,538 A | 9/1962 | Jech et al. | |
| 3,449,115 A | 6/1969 | Glamiche et al. | |
| 3,736,132 A | 5/1973 | Easterday et al. | |
| 3,802,850 A | 4/1974 | Clougherty | |
| 3,909,247 A | 9/1975 | Paris et al. | |
| 4,282,195 A | 8/1981 | Hoekje et al. | |
| 4,353,885 A * | 10/1982 | Hoekje | 423/289 |
| 4,373,947 A | 2/1983 | Buttner et al. | |
| 4,519,839 A | 5/1985 | Toyoaki et al. | |
| 4,525,206 A | 6/1985 | Soled et al. | |
| 4,687,632 A | 8/1987 | Hurd et al. | |
| 4,731,111 A | 3/1988 | Kopatz et al. | |
| 4,820,339 A | 4/1989 | Bienvenu et al. | |
| 4,894,086 A | 1/1990 | Huether et al. | |
| 4,906,436 A | 3/1990 | Gigliotti et al. | |
| 4,915,905 A | 4/1990 | Kampe et al. | |
| 4,999,336 A | 3/1991 | Nadkarni et al. | |
| 5,032,176 A | 7/1991 | Kametani et al. | |
| 5,322,666 A | 6/1994 | Watwe | |
| 5,498,446 A | 3/1996 | Axelbaum et al. | |
| 5,779,761 A | 7/1998 | Armstrong et al. | |
| 5,830,288 A | 11/1998 | Gigliotti et al. | |

(Continued)

FOREIGN PATENT DOCUMENTS

DE    11 29 710 B    5/1962

(Continued)

OTHER PUBLICATIONS

Powder Metallurgy Ti-6Al-4V-xB Allo, Journal of Medicine, May 2004.ys: Processing, Microstructure, and Properties, S. Tamirisakandala, R.B. Bhat, V.A. Ravi and D.B. Miracle, Member Journal of the Minerals, Metals & Materials Society, May 2004.

(Continued)

*Primary Examiner*—Roy King
*Assistant Examiner*—Ngoclan T. Mai
(74) *Attorney, Agent, or Firm*—McNees Wallace & Nurick, LLC

(57) ABSTRACT

An article made of constituent elements is prepared by furnishing at least one nonmetallic precursor compound, wherein all of the nonmetallic precursor compounds collectively contain the constituent elements. The constituent elements include a titanium-base metallic composition, boron present at a level greater than its room-temperature solid solubility limit, and, optionally, a stable-oxide-forming additive element present at a level greater than its room-temperature solid solubility limit. The precursor compounds are chemically reduced to produce a material comprising a titanium-base metallic composition having titanium boride particles therein, without melting the titanium-base metallic composition. The titanium-base metallic composition having the titanium boride particles therein is consolidated without melting.

25 Claims, 4 Drawing Sheets

U.S. PATENT DOCUMENTS

| | | |
|---|---|---|
| 5,930,580 A | 7/1999 | Everett |
| 5,958,106 A | 9/1999 | Armstrong et al. |
| 6,036,742 A | 3/2000 | Leutner et al. |
| 6,117,204 A | 9/2000 | Saito et al. |
| 6,152,982 A | 11/2000 | Froes et al. |
| 6,264,719 B1 | 7/2001 | Zhang et al. |
| 6,409,794 B2 | 6/2002 | Wolmer et al. |
| 6,540,811 B2 | 4/2003 | Hosoe et al. |
| 6,551,371 B1 | 4/2003 | Furuta et al. |
| 6,582,651 B1 | 6/2003 | Cochran, Jr. et al. |
| 6,635,098 B2 | 10/2003 | Abkowitz et al. |
| 6,663,763 B2 | 12/2003 | Strezov et al. |
| 6,737,017 B2 | 5/2004 | Woodfield et al. |
| 6,921,510 B2 * | 7/2005 | Ott et al. ................ 419/10 |
| 7,037,463 B2 * | 5/2006 | Woodfield et al. ........... 419/19 |
| 2002/0068005 A1 | 6/2002 | Meinhardt et al. |
| 2002/0073804 A1 | 6/2002 | Meis Dieter |
| 2003/0205108 A1 | 11/2003 | Lee et al. |
| 2003/0230170 A1 | 12/2003 | Woodfield et al. |
| 2003/0231974 A1 | 12/2003 | Woodfield et al. |
| 2004/0016319 A1 | 1/2004 | Woodfield et al. |
| 2004/0084323 A1 | 5/2004 | Strezov et al. |
| 2004/0123700 A1 | 7/2004 | Zhou et al. |

FOREIGN PATENT DOCUMENTS

| | | |
|---|---|---|
| EP | 0751228 | 1/1972 |
| EP | 0 728 223 B1 | 8/1997 |
| EP | 0 997 544 | 5/2000 |
| EP | 1 018 386 A1 | 12/2000 |
| EP | 1 101 831 | 5/2001 |
| GB | 883 429 A | 11/1966 |
| JP | 01 184203 A | 10/1989 |
| WO | WO 99/64638 | 12/1999 |
| WO | WO 00/76698 A1 | 12/2000 |

OTHER PUBLICATIONS

Cerme Ti Discontinuously Reinforced Ti-Matrix Composites: Manufacturing, Properties, and Applications, Stanley Abkowitz, Susan M. Abkowitz, Harvey Fisher and Patricia J. Schwartz, Member Journal of the Minerals, Metals & Materials Society, May 2004.

High-Temperature Deformation Behavior of Ti-TiB in Situ Metal-Matrix Composites, Sweety Kumari, N. Eswara Prasad, K.S. Ravi Chandran and G. Malakondaiah, Member Journal of the Minerals, Metals & Materials Society, May 2004.

The Prospects for Hybrid Fiber-Reinforced Ti-TIB-Matrix Composites, W. Hanusiak, C.F. Yoltan, J. Fields, V. Hammong, and R. Grabow, W. Hanusiak, C.F. Yolton, J. Fields, V. Hammond, and R. Gravow, Member Journal of the Minerals, Metals & Materials Society, May 2004.

TiB—Reinforced Ti Composites: Processing, Properties, Application Prospects, and Research Needs, K.S. Ravi Chandran, K. B.I Panda, and S.S. Sahay, Member Journal of the Minerals, Metals & Materials Society, May 2004.

Titanium-Boron Alloys and Composites: Processing, Properties, and Applications, K.S. Ravi Chandran and Daniel B. Miracle, Member Journal of the Minerals, Metals & Materials Society, May 2004.

The Pre-Alloyed Powder Metallurgy of Titanium with Boron and Carbon Additions, C.F. Yolton, Member Journal of the Minerals, Metals & Materials Society, May 2004.

The Automotive Application of Discontinuously Reinforced TiB-Ti Composites, Takashi Saito, Member Journal of the Minerals, Metals & Materials Society, May 2004.

Matthew J. Donachie, Jr: "Titanium (A Technical Guide)", ASM International, USA XP 002253129, p. 47-p.51.

Doyle, Eoghan T.M. et al. "Carbothermic reduction of nickel-cobalt-chromium oxide mixture for the production of NiCoCr superalloy powder" EPD Congr. 1992, Proc. Symp. TMS Annu. Meet., 745-58. Editor(s): Hager, John P.; Publisher: Miner. Met. Mater. Soc., Warrendale, PA. Coden: 58HHA7, 1992, XP0009029023.

* cited by examiner

METHOD FOR PRODUCING A TITANIUM METALLIC COMPOSITION HAVING TITANIUM BORIDE PARTICLES DISPERSED THEREIN

This application is a continuation in part of application Ser. No. 10/847,599, filed May 17, 2004, for which priority is claimed and whose disclosure is incorporated by reference; which is a continuation in part of application Ser. No. 10/172,217, filed Jun. 14, 2002 now U.S. Pat. No. 6,737,017, for which priority is claimed and whose disclosure is incorporated by reference; and a continuation in part of application Ser. No. 10/172,218, filed Jun. 14, 2002, now U.S. Pat. No. 7,329,381 for which priority is claimed and whose disclosure is incorporated by reference; and a continuation in part of application Ser. No. 10/329,143, filed Dec. 23, 2002 now U.S. Pat. No. 7,037,463, for which priority is claimed and whose disclosure is incorporated by reference; and a continuation in part of application Ser. No. 10/350,968, filed Jan. 22, 2003 now U.S. Pat. No. 6,921,510 for which priority is claimed and whose disclosure is incorporated by reference; and a continuation in part of application Ser. No. 10/371,743, filed Feb. 19, 2003, for which priority is claimed and whose disclosure is incorporated by reference.

This invention relates to the production of articles including titanium-base metallic compositions and, more particularly, to the production of articles made of titanium-base metallic compositions having titanium boride particles therein.

BACKGROUND OF THE INVENTION

One of the most demanding applications of materials in aircraft gas turbine engines is compressor and fan disks (sometimes termed "rotors") upon which the respective compressor blades and fan blades are supported. The disks rotate at many thousands of revolutions per minute, in a moderately elevated-temperature environment, when the gas turbine is operating. They must exhibit the required mechanical properties under these operating conditions.

Some of the gas turbine engine components, such as some of the compressor and fan disks, are fabricated from titanium metallic compositions. The disks are typically manufactured by furnishing the metallic constituents of the selected titanium metallic composition, melting the constituents, and casting an ingot of the titanium metallic composition. The cast ingot is then converted into a billet. The billet is further mechanically worked, typically by forging. The worked billet is thereafter upset forged, and then machined to produce the titanium-base metallic composition component.

Achieving the required mechanical properties at room temperature and up to moderately elevated temperatures, retaining sufficient environmental resistance, and preventing premature failure offer major challenges in the selection of the materials of construction and the fabrication of the articles. The chemistry and microstructure of the metallic composition must ensure that the mechanical properties of the article are met over the service temperature range of at least up to about 1200° F. for current titanium-base metallic composition components. The upper limit of about 1200° F. for service of such components is due principally to static-strength and creep-strength reduction at higher temperatures and the tendency for titanium to react with oxygen at elevated temperatures, forming a brittle oxygen-enriched layer, termed alpha case. Small mechanical or chemical irregularities in the final component may cause it to fail prematurely in service, and these irregularities must be minimized or, if present, be detectable by available inspection techniques and taken into account. Such irregularities may include, for example, mechanical irregularities such as cracks and voids, and chemical irregularities such as hard alpha irregularities (sometimes termed low-density inclusions) and high-density inclusions.

One recent approach to improving the properties of titanium-base metallic compositions, including the high-temperature strength, is the introduction of boron into the metallic composition to produce titanium boride particles dispersed therein. The introduction of boron has been accomplished by several different methods, such as conventional cast-and-wrought processing, powder metallurgy techniques such as gas atomization, and a blended elemental approach. The first two methods suffer from the limited solubility of boron in titanium. The boron tends to segregate strongly, forming relatively large titanium boride particles that are detrimental to ductility and fatigue. In order to avoid the segregation problem, the levels of boron added to the metallic composition by these first two methods is severely restricted, limiting the potential benefits of the boron addition, or the cooling rate during solidification must be very high. The blended elemental approach allows much larger additions of boron. However, because the boron is typically added as titanium diboride, and the phase in thermodynamic equilibrium with the alpha phase of titanium is the very-stable titanium monoboride, extended times at elevated temperatures are required to fully convert the titanium diboride to titanium monoboride. The required high temperatures and long times prevent the production of a uniform fine dispersion of titanium boride particles in the metallic composition.

It has been possible, using existing melting, casting, and conversion practice, to prepare non-boron-containing titanium-base metallic composition components such as compressor and fan disks that are fully serviceable. However, there is a desire and need for a manufacturing process to produce the disks and other components with even further-improved properties arising from the presence of titanium boride particles and greater freedom from irregularities, thereby improving the operating margins of safety. The present invention fulfills this need for an improved process, and further provides related advantages.

SUMMARY OF THE INVENTION

The present approach provides a method for producing a metallic article of a titanium-base metallic composition that also contains boron in an amount greater than the solubility limit of the boron in the metallic composition. The article has a good combination of mechanical properties in the temperature range up to about 1300° F., possible good resistance to environmental damage from oxidation, and a low incidence of irregularities. The elastic modulus of the material is improved and the wear resistance is increased by the presence of titanium boride particles. The boride dispersion is more uniform and finer than that resulting from other production techniques. The material produced by the present approach has better properties at the same operating temperatures as compared with conventional titanium metallic compositions, and also allows the material to be used to higher operating temperatures than possible with conventional titanium metallic compositions. The present approach utilizes a production technique that allows the incorporation of metallic alloying elements that cannot be readily introduced into titanium-base metallic compositions in a usable form and distribution using conventional melting procedures.

A method for producing an article made of constituent elements in constituent-element proportions comprises the steps of furnishing at least one nonmetallic precursor compound, wherein all of the nonmetallic precursor compounds collectively contain the constituent elements in their respective constituent-element proportions. The constituent elements comprise a titanium-base metallic composition, and boron present at a level greater than its room-temperature solid solubility limit in the titanium-base metallic composition. The precursor compounds are chemically reduced to produce a material comprising a titanium-base metallic composition having titanium boride particles therein, without melting the titanium-base metallic composition. As used herein in describing the present method, "titanium boride" refers to $TiB$, $TiB_2$, $Ti_3B_4$, or other titanium-boron-containing compounds, possibly modified due to the presence of alloying elements. The titanium-base metallic composition having the titanium boride particles therein is consolidated to produce a consolidated article, without melting the titanium-base metallic composition and without melting the consolidated titanium-base metallic composition. The present approach is compatible with the embodiments discussed herein and those incorporated by reference.

The boron constituent element is preferably furnished in an amount not greater than that required to form about ninety percent by volume titanium boride in the consolidated material. Most specifically, the nonmetallic precursor compounds are furnished such that boron is present in the consolidated material in an amount of not greater than about 17 weight percent of the consolidated material. More preferably, the nonmetallic precursor compounds are furnished such that boron is present in the consolidated material in an amount of from about 0.05 to about 17 weight percent of the consolidated material. The amount of boron present in the material may be considered in two ranges, a hypoeutectic range, which for the titanium-boron binary system is from about 0.05 to about 1.5 percent by weight boron, and a hypereutectic range, which for the titanium-boron binary system is from about 1.5 to about 17 percent by weight boron. Alloys with other elements in addition to titanium and boron may have other phases and ranges, but are within the scope of the present approach. The present approach permits the preparation of materials having the same boron content as may be achieved with other techniques, typically up to about 5 percent by weight of boron, and also the preparation of materials having greater boron content than may be achieved with other techniques, typically in the range of from about 5 to about 17 percent by weight of boron. In each case, the materials have a fine, uniform titanium boride dispersion.

Boron is present at a level in excess of its room-temperature solid solubility in the titanium-base metallic composition matrix, up to a level required to form no more than about 90 percent by volume titanium boride. For smaller additions in excess of the limit of solid solubility, a fine dispersion of titanium boride particles is formed, providing significant high-temperature static strength and high-temperature creep strength benefits. For larger additions in excess of the solid solubility, there is a larger volume fraction of titanium boride particles present and substantial rule-of-mixtures-strengthening benefits. At both levels of boron additions in excess of the solid solubility limit, the elastic modulus and wear resistance of the material are significantly improved over conventional titanium-base metallic compositions.

Optionally, the step of furnishing may include the step of furnishing a nonmetallic precursor compound of a stable-oxide-forming additive element that forms a stable oxide in the titanium-based metallic composition. In such a material, at least one additive element is present at a level greater than its room-temperature solid solubility limit in the titanium-base metallic composition. The method includes an additional step, after the step of chemically reducing, of oxidizing the metallic composition, including the oxygen-forming additive element, at a temperature greater than room temperature. An other additive constituent may be added during the step of furnishing or the step of chemically reducing.

The stable-oxide-forming additive element is a strong oxide former in a titanium-based metallic composition. Some stable-oxide-forming additive elements may not form a stable oxide where the titanium-based metallic composition has substantially no oxygen in solid solution, and instead require that there be up to about 0.5 weight percent oxygen in solution in order for the stable oxide to form. The presence of such stable-oxide-forming additive elements is within the scope of the present approach, because such levels of oxygen may be present in the titanium-base metallic composition with the present approach. Thus, preferably, the titanium-base metallic composition has from zero to about 0.5 weight percent oxygen in solid solution. It may have greater amounts of oxygen in solid solution, although the ductility may be reduced if more than about 0.5 weight percent oxygen is present. Preferred stable-oxide-forming additive elements include magnesium, calcium, scandium, yttrium, lanthanum, cerium, praseodymium, neodymium, promethium, samarium, europium, gadolinium, terbium, dysprosium, holmium, erbium, thulium, ytterbium, and lutetium, and mixtures thereof. These elements cannot be introduced into titanium-base metallic compositions at levels above their solubility limits using conventional melting techniques, because of their limited liquid phase miscibility, their reaction with the melting crucible, and/or the formation of coarse globs during solidification that result in deleterious effects to the properties.

The oxygen content may be controlled prior to, and/or during, the reduction step, as described subsequently. The oxygen reacts with the optional stable-oxide-forming additive elements to produce a substantially uniformly distributed oxide dispersion in the metallic composition matrix during or after the reduction step. The oxide dispersion improves the properties of the final metallic article, particularly in regard to the creep strength required at elevated temperatures in a similar manner to the fine titanium boride dispersion. The fine oxide dispersion may alter the nature of the scale formed during exposure; if not all the stable oxide former is oxidized during or after reduction, it may actively getter oxygen during service exposure.

The precursor compound or compounds are furnished in a form that is suitable for the selected chemical reduction technique. They may be furnished, for example, as metallic oxides or metallic halides. They may be furnished to the chemical reduction as a pre-compressed mass, preferably larger in size than the desired final article, in a finely divided form, or in a gaseous or liquid form.

The chemical reduction may be performed by any operable approach, as long as the metallic composition material is not melted. If it is melted, the subsequent resolidification results in a loss of many of the benefits of the present approach due to the solidification behavior of the metallic phases, the boron, and the optional stable-oxide-forming additive element(s). The preferred approach is a vapor-phase reduction technique, wherein the precursor compounds and the reduced metallic composition material are not melted, and solid phase reduction may be used as well. The reduction technique produces the metallic composition material in a physical form that is characteristic of the selected reduction technique. For example, the material may be a sponge or a plurality of particles.

The preparation of the titanium-base metallic composition and the article without melting has important benefits. Significantly in respect to the present approach, boron and most optional stable-oxide-forming additive elements are not sufficiently miscible with molten titanium and titanium metallic compositions to introduce large amounts into the melt and thence into the melted-and-cast titanium metallic compositions, and/or those elements have minimal solubility in the titanium-base metallic composition with the result that after melting and casting a useful boride-dispersion and oxide-dispersion containing structure cannot be achieved. If attempts are made to introduce a substantial amount of boron by melting and casting or by powder metallurgy techniques, the boron is present as large boride-compound particles in the final article, resulting in a reduction in properties as described previously. In addition, if the optional stable-oxide-forming additive elements are added by melting and casting, the result is a chemical reaction with the environment or the molten metal and the presence of the stable-oxide-forming additive elements as large globs in the final article. These globs of material do not provide the oxygen reaction and oxygen-gettering properties achieved with the present approach.

Additionally, the production of the material and the article without melting avoids the contamination and elemental segregation that are associated with the conventional titanium sponge-making, melting and alloying, and casting processes. The metallic composition material may be made without the introduction of the impurities that originate in the conventional metallic sponge-manufacturing process, and those associated with the melting and casting operations. The introduction of iron, chromium, and nickel from the sponge-producing vessels into titanium metallic compositions is a particular concern, because these elements adversely affect the creep strength of the titanium metallic compositions.

After the chemical reduction, the metallic composition material is preferably consolidated to produce a consolidated metallic article, without melting the metallic composition material and without melting the consolidated metallic article. Any operable consolidation technique, such as hot isostatic pressing, forging, extrusion, pressing and sintering, or direct powder consolidation extrusion or rolling, or a combination of these methods, may be used. The consolidation is preferably performed at as low a temperature as possible, to avoid coarsening the titanium boride particles and the optional oxide dispersion and/or strong-oxide-former particles. As in the earlier stages of the processing, if the metallic material is melted, upon resolidification the benefits are largely lost due to the solidification behavior of the material and the introduction of melt-related and solidification-related irregularities.

The consolidated article may be mechanically formed as desired, by any mechanical forming technique.

The material may be heat-treated either after the chemical reduction step, after the consolidation step (if used), after mechanical forming, or subsequently.

After cooling to room temperature the metallic composition material is a titanium-base metallic composition containing titanium boride particles, either as a fine dispersion or as a higher volume fraction of titanium boride phase, and optionally with the stable-oxide-forming additive element(s) dispersed therethrough. The optional stable-oxide-forming additive element or elements are present in solid solution (either below the solubility limit or in a supersaturated state) and/or as one or more discrete dispersion phases. The dispersion phases may be unoxidized stable-oxide-forming additive elements or an already oxidized dispersion or a mixture of both. The stable-oxide-forming additive elements that are in solid solution or a non-oxidized discrete dispersion are available for subsequent reaction with oxygen that may be in the matrix or diffuses into the metallic material in subsequent processing or service.

The consolidated material may form the entire article, or may be added as an insert to another article that is manufactured via any route, including traditional casting and working, casting, or similar approach as described herein. The insert may comprise a single, substantially uniform bulk composition, or it may comprise a mixture of at least two materials having different bulk compositions. In any of these embodiments where the consolidated material is added as an insert, the surrounding article may have the same or a different composition. The insert may be provided at any operable point of the processing.

In a typical application where the optional stable-oxide-forming element is added, the manufactured article is oxidized, either in an oxygen-containing environment or by the reaction of oxygen in the titanium, at a temperature greater than room temperature, and typically greater than about 1000° F., after the chemical reduction that places it into a metallic form. The oxidation causes at least some of the remaining unreacted portion of the stable-oxide-forming additive element(s) to chemically react with the oxygen to form further oxide dispersoids in the material. The exposure to oxygen may be either during service or as part of a heat treatment prior to entering service, or both. When the exposure is during service, the oxygen-forming element(s) chemically combine with (i.e., getter) the oxygen that diffuses into the article from the environment. This reaction occurs most strongly near the surface of the article, so that the resulting dispersion of oxide dispersoids occurs primarily near the surface. When the exposure is as a part of a heat treatment, the depth of the oxide dispersion layer may be controlled to a specific value. In the event that the metallic article is very thin (e.g., about 0.005 inch or less), a uniform dispersion may be produced.

The formation of the boride dispersion has several important benefits. First, a substantially uniformly distributed dispersion aids in achieving the desired mechanical properties, including static strength, fatigue strength, and creep strength, which are stable over extended periods of exposure at elevated temperatures, through dispersion strengthening of the base-metal titanium metallic composition matrix. The substantially uniformly distributed dispersion also aids in limiting grain growth of the base-metal titanium metallic composition matrix. Second, the modulus of elasticity of the titanium-base metallic composition is significantly increased, allowing the article to withstand substantially higher loads while deforming elastically. Third, the wear resistance and erosion resistance of the article are substantially improved, allowing increased service time in a given application. Fourth, the presence of the fine dispersion results in improved ductility compared with an article prepared by a conventional cast-and-wrought, cast, or gas-atomized or blended-elemental powder metallurgy approach. The boride dispersion may be formed in any titanium-base metallic composition matrix, including alpha, near-alpha, alpha-plus-beta, near-beta, and beta titanium metallic compositions, and any titanium-base intermetallics including those based on the alpha-2, orthorhombic, and gamma titanium aluminides.

The optional formation of the oxide dispersion has several important benefits. First, a substantially uniformly distributed dispersion aids in achieving the desired mechanical properties, which are stable over extended periods of exposure at elevated temperature, through dispersion strengthening of the base-metal matrix, and also aids in limiting grain growth of the base-metal matrix. Second, when the exposure to environmental oxygen occurs during a pre-service oxidation or during service, the oxygen diffusing into the article would normally cause the formation of an "alpha case" near the surface of conventional alpha-phase-containing titanium metallic compositions. In the present approach, the stable-oxide-forming additive elements either in solution or as a separate phase getter the inwardly diffusing oxygen from solid solution and adding to the oxide dispersion, thereby reducing the incidence of alpha case formation and the associated possible premature failure. Third, in some cases the oxide dispersoids have a greater volume than the discrete metallic phases from which they were formed. The formation of the oxide dispersoids produces a compressive stress state that is greater near to the surface of the article than deeper in the article. The compressive stress state aids in preventing premature crack formation and growth during service. Fourth, the formation of a stable oxide dispersion at the surface of the article acts as a barrier to the inward diffusion of additional oxygen. Fifth, the removing of excess oxygen in solution from the matrix allows the introduction of higher metallic alloying levels of alpha-stabilizer elements such as aluminum and tin, in turn promoting improved modulus of elasticity, creep strength, and oxidation resistance of the matrix. Sixth, the presence of excess oxygen in solution in some types of titanium metallic compositions, such as alpha-2, orthorhombic, and gamma-based aluminides, reduces the ductility of the titanium metallic composition. The present approach getters that oxygen, so that the ductility is not adversely affected.

The present approach thus extends to an article comprising a titanium-metallic composition matrix, a distribution of stable titanium boride dispersoids, and optionally a distribution of stable oxide dispersoids in the titanium-metallic composition matrix. The boron is present in an amount above its room temperature solid solubility limit in the titanium-metallic composition matrix. The optional stable oxide dispersoids are an oxide of a stable-oxide-forming additive element that is present in an amount above its room temperature solid solubility limit in the titanium-metallic composition matrix. The titanium-metallic composition matrix does not have a melted-and-cast microstructure. Other compatible features discussed herein may be employed in conjunction with this article.

An article comprises a titanium-metallic composition matrix, and a distribution of titanium boride particles in the titanium-metallic composition matrix, wherein the article has from about 0.05 to about 17 percent by weight of boron. The article may include at least 0.1 volume percent of an oxide of an additive element. Other compatible features as discussed herein may be used with this embodiment.

Preferably, the article is made without the presence of any freestanding titanium boride phase. That is, one possible approach to making a titanium-base article with titanium boride phase dispersed therein is to make the titanium boride phase as freestanding particles, such as powder or fibers, and then to disperse the freestanding particles into the titanium-base composition. This approach has the disadvantage that the particles are typically larger in size than those made by the present approach, may have flaws therein that reduce their mechanical properties, and are more difficult to disperse uniformly in the titanium-base matrix.

The present approach thus provides a titanium-base metallic article with improved properties and improved stability. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
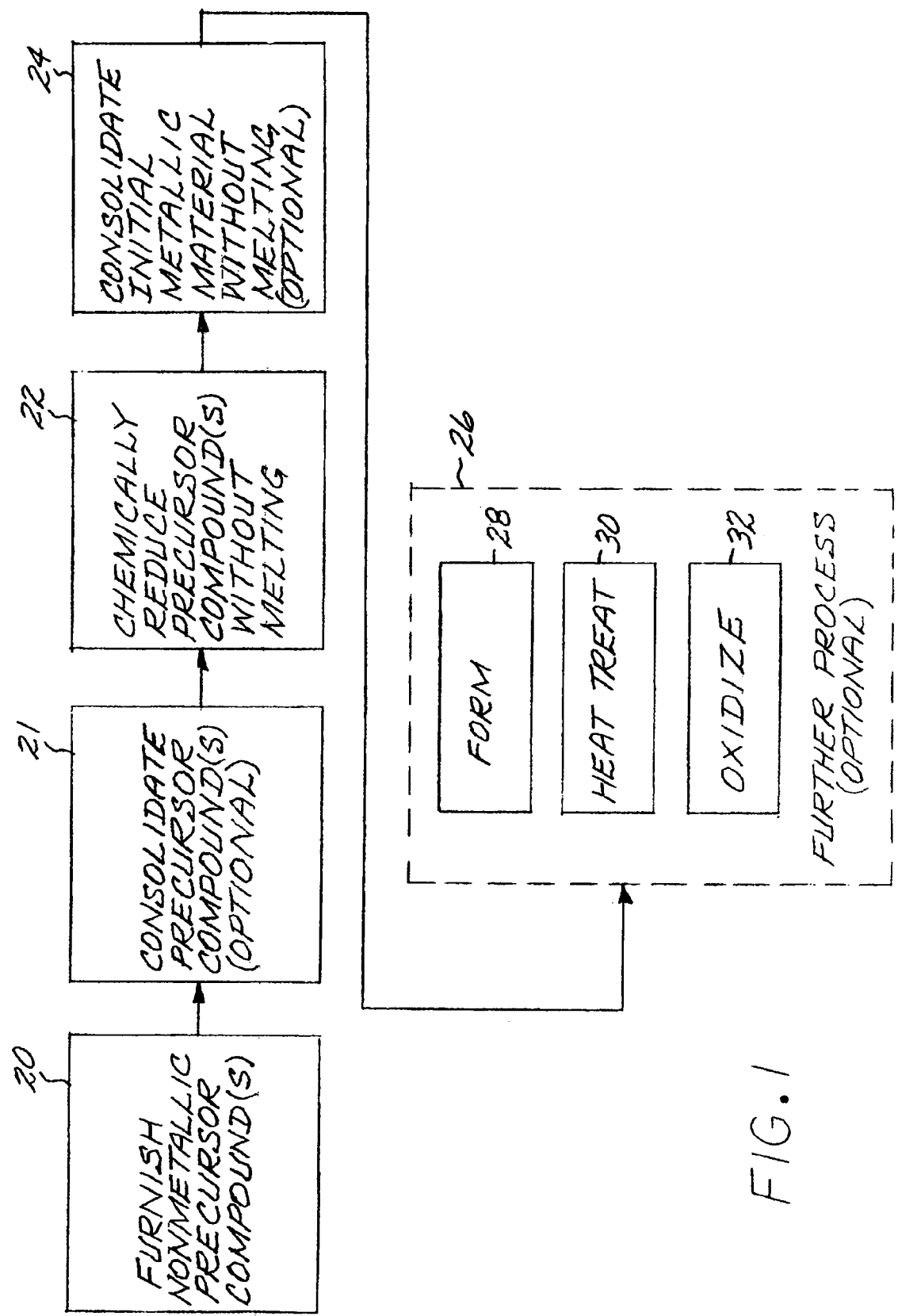
FIG. 1 is a block flow diagram of an approach for practicing the invention.

FIG. 1 depicts a preferred method for producing a metallic article made of constituent elements in constituent-element proportions. At least one nonmetallic precursor compound is furnished, step 20. All of the nonmetallic precursor compounds collectively contain the constituent elements in their respective constituent-element proportions. The metallic elements may be supplied by the precursor compounds in any operable way. In the preferred approach, there is exactly one precursor compound for each metallic alloying element, and that one precursor compound provides all of the material for that respective metallic constituent in the metallic composition. For example, for a four-element metallic material that is the final result of the process, a first precursor compound supplies all of the first element, a second precursor compound supplies all of the second element, a third precursor compound supplies all of the third element, and a fourth precursor compound supplies all of the fourth element. Alternatives are within the scope of the approach, however. For example, several of the precursor compounds may together supply all of one particular metallic element. In another alternative, one precursor compound may supply all or part of two or more of the metallic elements. The latter approaches are less preferred, because they make more difficult the precise determination of the elemental proportions in the final metallic material. The final metallic material is typically not a stoichiometric compound having relative amounts of the metallic constituents that may be expressed as small integers.

After processing, the constituent elements comprise a titanium-base metallic composition, boron, and optionally a stable-oxide-forming additive element. A titanium-base metallic composition has more titanium by weight than any other element (although there may not be more titanium by atomic fraction than any other element, as for example in some gamma-phase titanium aluminides). The titanium-base metallic composition may be pure titanium (e.g., commercially pure or CP titanium), or a metallic alloy of titanium and other elements, such as, for example, Ti-6Al-4V, Ti-6Al-2Sn-4Zr-2Mo-0.1Si, Tl-6Al-2Sn-4Zr-6Mo-0.1Si, Ti-5.8Al-4Sn-3.5Zr-0.7Nb-0.5Mo-0.35Si, Ti-10V-2Fe-3Al, Ti-15Mo-3Al-2.7Nb-0.25Si (also known as beta 21S) and Ti-32.7Al-2.5Cr-4.8Nb (also known as Ti-48-2-2). Unless otherwise specified herein, all compositions are given in weight percent. Titanium metallic alloy compositions of particular interest include alpha-beta phase titanium metallic compositions, beta-phase titanium metallic compositions, alpha-2, orthorhombic, and gamma-phase titanium aluminide metallic compositions, although the invention is not limited to these metallic compositions. The boron level ranges from greater than the solubility limit at room temperature of boron in the titanium-base metallic composition to the level required to produce no more than ninety percent by volume titanium boride. Typically, the boron is present in an amount of from 0.05 percent to 17 percent by weight of the total weight of the final consolidated material. The result is a consolidated material having at least two phases, including one or more metallic phases constituting the titanium-base metallic composition, titanium boride, and optionally one or more stable oxide phases. As used herein in describing the present method, "titanium boride" refers to TiB, which is present in most materials made by the present approach, $TiB_2$, which is present where the matrix is a gamma-phase titanium aluminide, $Ti_3B_4$, and other titanium borides or other titanium-boron-containing compounds, possibly modified due to the presence of alloying elements. "Titanium monoboride" refers specifically to TiB, and "titanium diboride" refers specifically to $TiB_2$.

The optional stable-oxide-forming additive element is characterized by the formation of a stable oxide in the titanium-base metallic composition. An element is considered to be a stable-oxide-forming additive element if it forms a stable oxide in a titanium-base metallic composition, where the titanium-base metallic composition either has substantially no oxygen in solid solution or where the titanium-base metallic composition has a small amount of oxygen in solid solution. As much as about 0.5 weight percent oxygen in solid solution may be required for the stable-oxide-forming additive element to function as an effective stable-oxide former. Thus, preferably, the titanium-base metallic composition has from zero to about 0.5 weight percent oxygen in solid solution. Larger amounts of oxygen may be present, but such larger amounts may have an adverse effect on ductility. In general, oxygen may be present in a material either in solid solution or as a discrete oxide phase such as the oxides formed by the stable-oxide-forming additive elements when they react with oxygen.

Titanium has a strong affinity for and is highly reactive with oxygen, so that it dissolves many oxides, including its own. The stable-oxide-forming additive elements within the scope of the present approach form a stable oxide that is not dissolved by the titanium metallic composition matrix during typical thermal conditions associated with reduction, consolidation, heat treat, and exposure. Examples of stable-oxide-forming additive elements are strong oxide-formers such as magnesium, calcium, scandium, and yttrium, and rare earths such as lanthanum, cerium, praseodymium, neodymium, promethium, samarium, europium, gadolinium, terbium, dysprosium, holmium, erbium, thulium, ytterbium, and lutetium, and mixtures thereof.

At least one additive element may optionally be present at a level greater than its room-temperature solid solubility limit in the titanium-base metallic composition. After subsequent processing, each such additive element may be present in one of several forms. The additive element may be present as a non-oxide dispersion of the element. It may also be present in solid solution. It may also be present in a form that is reacted with oxygen to form a coarse oxide dispersion or a fine oxide dispersion. The coarse oxide dispersion forms by the reaction of the non-oxide dispersion of the element with oxygen that is typically present in the metallic matrix, thereby gettering the oxygen. The fine oxide dispersion forms by the reaction of the stable-oxide-forming additive element that is in solid solution, with oxygen that is in the matrix or diffuses into the metallic material from the surface during exposure to an oxygen-containing environment.

The precursor compounds are nonmetallic and are selected to be operable in the reduction process in which they are reduced to metallic form. In one reduction process of interest, vapor-phase reduction, the precursor compounds are preferably metal halides. In another reduction process of interest, solid-phase reduction, the precursor compounds are preferably metal oxides. Mixtures of different types of precursor compounds may be used.

Some constituents, termed "other additive constituents", may be difficult to introduce into the metallic composition. For example, suitable nonmetallic precursor compounds of the constituents may not be available, or the available nonmetallic precursor compounds of the other additive constituents may not be readily chemically reducible in a manner or at a temperature consistent with the chemical reduction of the other nonmetallic precursor compounds. It may be necessary that such other additive constituents ultimately be present as elements in solid solution in the metallic composition, as compounds formed by reaction with other constituents of the metallic composition, or as already-reacted, substantially inert compounds dispersed through the metallic composition. These other additive constituents or precursors thereof may be introduced from the gas, liquid, or solid phase, as may be appropriate, using one of the four approaches subsequently described or other operable approaches.

In a first approach, the other additive constituent or constituents are furnished as elements or compounds and are mixed with the precursor compounds prior to or concurrently with the step of chemically reducing. The mixture of precursor compounds and other additive constituents is subjected to the chemical reduction treatment of step 22, but only the precursor compounds are actually reduced and the other additive constituents are not reduced.

In a second approach, the other additive constituent or constituents in the form of solid particles are furnished but are not subjected to the chemical reduction treatment used for the base metal. Instead, they are mixed with the initial metallic material that results from the chemical reduction step, but after the step of chemically reducing 22 is complete. This approach is particularly effective when the step of chemically reducing is performed on a flowing powder of the precursor compounds, but it also may be performed using a pre-compacted mass of the precursor compounds, resulting in a spongy mass of the initial metallic material. The other additive constituents are adhered to the surface of the powder or to the surface of, and into the porosity of, the spongy mass. Solid particles may be optionally reacted in one or more steps if they are precursors to the other additive constituent.

In a third approach, the precursor is first produced as powder particles, or as a sponge by compacting the precursor compounds of the metallic elements. The particles are, or the sponge is, then chemically reduced. The other additive constituent is thereafter produced at the surfaces (external and internal, if the particles are spongelike) of the particles, or at the external and internal surfaces of the sponge, from the gaseous phase. In one technique, a gaseous precursor or elemental form (e.g., methane, nitrogen, or borane gas) is flowed over the surface of the particle or sponge to deposit the compound or element onto the surface from the gas. The material produced at the surfaces may be optionally reacted in one or more steps if they are precursors to the other additive constituent. In an example, boron is supplied to a titanium surface by flowing borane over the surface, and in subsequent processing the deposited boron is reacted to form titanium boride. The gas carrying the constituent of interest may be supplied in any operable manner, such as from a commercially available gas or by generating the gas such as by the electron beam vaporization of a ceramic or metal, or using a plasma.

A fourth approach is similar to the third approach, except that the other additive constituent is deposited from a liquid rather than from a gas. The precursor is first produced as powder particles, or as a sponge by compacting the precursor compounds of the metallic elements. The particles are, or the sponge is, then chemically reduced. The other additive constituent is thereafter produced at the surfaces (external and internal, if the particles are spongelike) of the particles, or at the external and internal surfaces of the sponge, by deposition from the liquid. In one technique, the particulate or sponge is dipped into a liquid solution of a precursor compound of the other additive constituent to coat the surfaces of the particles or the sponge. The precursor compound of the other additive constituent is second chemically reacted to leave the other additive constituent at the surfaces of the particles or at the surfaces of the sponge. In an example, lanthanum may be introduced into a titanium-base metallic composition by coating the surfaces of the reduced particles or sponge (produced from the precursor compounds) with lanthanum chloride. The coated particles are, or the sponge is, thereafter heated and/or exposed to vacuum to drive off the chlorine, leaving lanthanum at the surfaces of the particles or sponge. Optionally, the lanthanum-coated particles or sponge may be oxidized to form a fine lanthanum-oxygen dispersion, using oxygen from the environment or from solution in the metal, or the lanthanum-coated particles or sponge may be reacted with another element such as sulfur. In another approach, the constituent is electrochemically plated onto the particles or the sponge. In yet another approach, the particles or sponge may be dipped into a bath containing the other additive constituent, removed from the bath, and any solvent or carrier evaporated to leave a coating on the surface of the particle or sponge.

Whatever the reduction technique used in step 22 and however the other additive constituent is introduced, the result is a mixture that comprises the metallic composition. Methods for introducing other additive constituents may be performed on precursors prior to the reduction of the base-metal constituent, or on already-reduced material. The metallic composition may be free-flowing particles in some circumstances, or have a sponge-like structure in other cases. The sponge-like structure is produced in the solid-phase reduction approach if the precursor compounds have first been compacted together prior to the commencement of the actual chemical reduction. The precursor compounds may be compressed to form a compressed mass that is larger in dimensions than a desired final metallic article.

The chemical composition of the initial metallic composition is determined by the types and amounts of the metals in the mixture of nonmetallic precursor compounds furnished in step 20, and by the other additive constituents that are introduced in the processing. The relative proportions of the metallic elements are determined by their respective ratios in the mixture of step 20 (not by the respective ratios of the compounds, but the respective ratios of the metallic elements). The initial metallic composition has more titanium by weight than any other metallic element in the precursor compounds, producing a titanium-base initial metallic composition.

The nonmetallic precursor compounds are selected to provide the necessary metallic alloying elements in the final metallic article, and are mixed together in the proper proportions to yield the necessary proportions of these metallic alloying elements in the metallic article. For example, if the final article were to have particular proportions of titanium, aluminum, vanadium, boron, erbium, and oxygen in the ratio of 86.5:6:4:2:3:0.5 by weight, the nonmetallic precursor compounds are preferably titanium chloride, aluminum chloride, vanadium chloride, boron chloride, and erbium chloride for vapor-phase reduction. The final oxygen content is controlled by the reduction process as discussed subsequently. Nonmetallic precursor compounds that serve as a source of more than one of the metals in the final metallic article may also be used. These precursor compounds are furnished and mixed together in the correct proportions such that the ratio of titanium to aluminum to vanadium to boron to erbium in the mixture of precursor compounds is that required to form the metallic composition in the final article.

Optionally, the nonmetallic precursor compounds may be pre-consolidated, step 21, prior to chemical reduction by techniques such as solid-phase reduction. The pre-consolidation leads to the production of a sponge in the subsequent processing, rather than particles. The pre-consolidation step 21, when used, is performed by any operable approach, such as pressing the nonmetallic precursor compounds into a pre-consolidated mass.

The single nonmetallic precursor compound or the mixture of nonmetallic precursor compounds is chemically reduced to produce metallic particles or sponge, without melting the precursor compounds or the metal, step 22. As used herein, "without melting", "no melting", and related concepts mean that the material is not macroscopically or grossly melted for an extended period of time, so that it liquefies and loses its shape. There may be, for example, some minor amount of localized melting as low-melting-point elements melt and are diffusionally alloyed with the higher-melting-point elements that do not melt, or very brief melting for less than about 10 seconds. Even in such cases, the gross shape of the material remains unchanged.

In one preferred reduction approach, termed vapor-phase reduction because the nonmetallic precursor compounds are furnished as vapors or gaseous phase, the chemical reduction may be performed by reducing mixtures of halides of the base metal and the metallic alloying elements using a liquid alkali metal or a liquid alkaline earth metal. For example, titanium tetrachloride and the halides of the metallic alloying elements are provided as gases. A mixture of these gases in appropriate amounts is contacted to molten sodium, so that the metallic halides are reduced to the metallic form. The metallic composition is separated from the sodium. This reduction is performed at temperatures below the melting point of the metallic composition. The approach is described more fully in U.S. Pat. Nos. 5,779,761 and 5,958,106, and U.S. Patent Publication 2004/0123700, all of whose disclosures are incorporated by reference.

Reduction at lower temperatures rather than higher temperatures is preferred. Desirably, the reduction is performed at temperatures of 600° C. or lower, and preferably 500° C. or lower. By comparison, prior approaches for preparing titanium- and other metallic compositions often reach temperatures of 900° C. or greater. The lower-temperature reduction is more controllable, and also is less subject to the introduction of contamination into the metallic composition, which contamination in turn may lead to chemical irregularities. Additionally, the lower temperatures reduce the incidence of sintering together of the particles during the reduction step and limits the potential coarsening of the stable boride and optional oxide dispersions.

In this vapor-phase reduction approach, a nonmetallic modifying element or compound presented in a gaseous form may be mixed into the gaseous nonmetallic precursor compound prior to its reaction with the liquid alkali metal or the liquid alkaline earth metal. In one example, gaseous oxygen may be mixed with the gaseous nonmetallic precursor compound(s) to increase the level of oxygen, respectively, in the initial metallic particle. It is sometimes desirable, for example, that the oxygen content of the metallic material initially be sufficiently high to form oxide dispersions by reaction with the stable-oxide-forming additive elements to strengthen the final metallic article. Rather than adding the oxygen in the form of solid titanium dioxide powder, as is sometimes practiced for titanium-base metallic compositions produced by conventional melting techniques, the oxygen is added in a gaseous form that facilitates mixing and minimizes the likelihood of the formation of hard alpha phase in the final article. When the oxygen is added in the form of titanium dioxide powder in conventional melting practice, agglomerations of the powder may not dissolve fully, leaving fine particles in the final metallic article that constitute chemical irregularities. The present approach avoids that possibility. In the reduction step, boron may be added as a borane gas, or nitrogen added in gaseous form.

In another reduction approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference in its entirety. Briefly, in this variation of fused salt electrolysis the mixture of nonmetallic precursor compounds, furnished in a finely divided solid form, is immersed in an electrolysis cell in a fused salt electrolyte such as a chloride salt at a temperature below the melting temperature of the metallic composition that forms from the nonmetallic precursor compounds. The mixture of nonmetallic precursor compounds is made the cathode of the electrolysis cell, with an inert anode. The elements combined with the metals in the nonmetallic precursor compounds, such as oxygen in the preferred case of oxide nonmetallic precursor compounds, are partially or completely removed from the mixture by chemical reduction (i.e., the reverse of chemical oxidation). The reaction is performed at an elevated temperature to accelerate the diffusion of the oxygen or other gas away from the cathode. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a desired low level. The chlorides and mixtures of chlorides of barium, calcium, cesium, lithium, strontium, and yttrium are preferred. The chemical reduction is preferably, but not necessarily, carried to completion, so that the nonmetallic precursor compounds are completely reduced. Not carrying the process to completion is a method to control the oxygen content of the metal produced and to allow subsequent formation of the oxide dispersion. If the pre-consolidation step 21 is performed, the result of this step 22 may be a metallic sponge. The boron and nitrogen contents may be controlled by starting with a boride or a nitride, and reducing the compound by an electrolytic process.

In another reduction approach, termed "rapid plasma quench" reduction, the precursor compound such as titanium chloride is dissociated in a plasma arc at a temperature of over 4500° C. The precursor compound is rapidly heated, dissociated, and quenched in hydrogen gas. The result is fine metallic-hydride particles. Any melting of the metallic particles is very brief, on the order of 10 seconds or less, and is within the scope of "without melting" and the like as used herein. The hydrogen is subsequently removed from the metallic-hydride particles by a vacuum heat treatment. Oxygen may also be added to react with the stable-oxide-forming additive elements to form the stable oxide dispersion. Boron is added to react with titanium to produce a titanium boride.

Whatever the reduction technique used in step 22, the result is a material of a metallic titanium-base metallic composition, titanium boride, and optionally stable oxide particles. The material may be free-flowing particles in some circumstances, or have a sponge-like structure in other cases. The sponge-like structure is produced in the solid-phase reduction approach if the precursor compounds have first been pre-compacted together (i.e., optional step 21) prior to the commencement of the actual chemical reduction. The precursor compounds may be compressed to form a compressed mass that is larger in dimensions than a desired final metallic article.

Optionally but preferably, the material is consolidated to produce a consolidated metallic article, step 24, without melting the titanium-base metallic composition and without melting the consolidated titanium-base metallic composition. The consolidation step 24 may be performed by any operable technique, with examples being hot isostatic pressing, forging, extrusion, pressing and sintering, and direct powder consolidation extrusion or rolling, or a combination of these methods.

Figure 2:
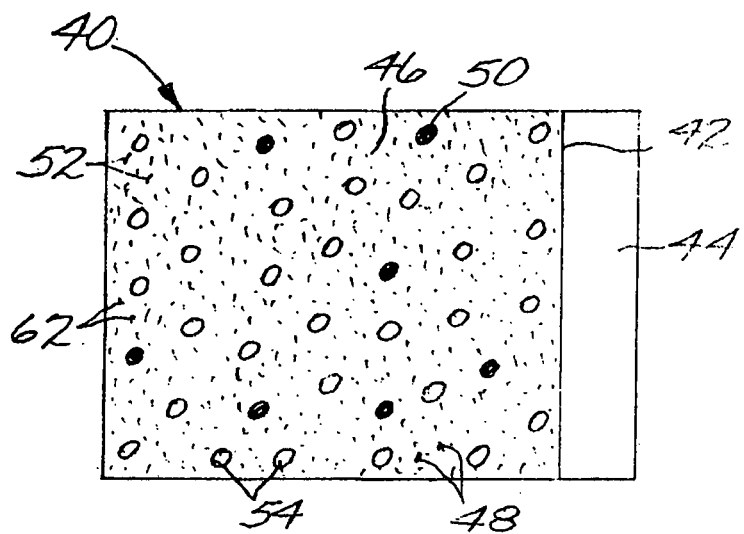
FIG. 2 is an idealized microstructure of the metallic article, after some oxidation that produces a uniform oxide dispersion.
Figure 3:
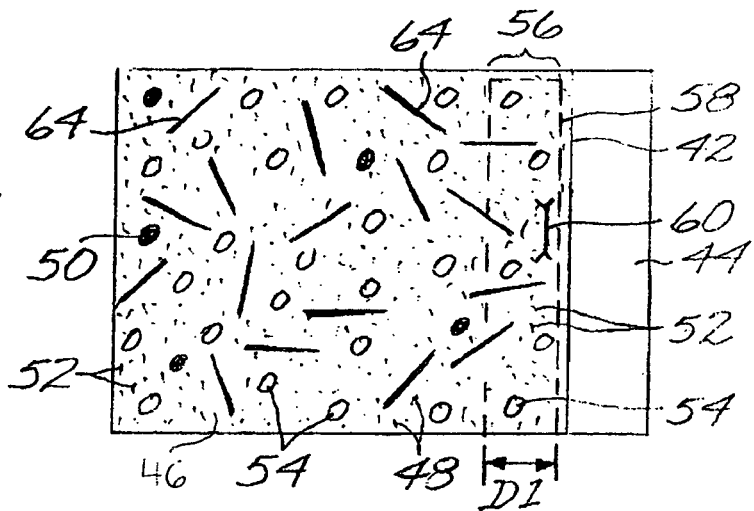
FIG. 3 is an idealized microstructure of the metallic article, after inward diffusion of oxygen during heat treatment or service.

FIGS. 2 and 3 illustrate the microstructure of the material 40 having a surface 42 facing the environment 44. The metallic article 40 has a microstructure of a titanium-base metallic composition matrix 46 with the titanium boride particles and optionally the stable-oxide-forming additive element(s) dispersed therethrough. The titanium boride particles may be present in different forms, depending upon the percentage of boron present and other factors. The boron is preferably present in an amount of from 0.05 percent to 17 percent by weight of the total. If the boron is less than 0.05 percent by weight, there is no titanium boride present to be an effective strengthener because the boron is in solid solution. If the boron is present in an amount of from 0.05 to 1.5 percent by weight, the titanium boride particles are present as a fine titanium boride dispersoid phase 62 dispersed in the titanium-base metallic composition matrix 46, as illustrated in FIG. 2, which produces a dispersoid-strengthening effect. These fine dispersoid particles are smaller in size than those produced by prior processes for preparing titanium-titanium boride materials. If the boron is present in an amount of from 1.5 to 17 percent by weight, the titanium boride particles are present as a coarse titanium boride phase 64 having a relatively higher volume fraction, as illustrated in FIG. 3, as compared with the structure shown in FIG. 2. (As used herein, "coarse" and "fine" are used only in a relative sense to each other, with a "coarse" phase being larger in size than "fine" dispersoids.) The coarse titanium boride phase 64 produces a composite strengthening effect. However, it may be possible to manipulate the microstructure of a high weight percentage boron composition (1.5-17%) by low temperature processing during consolidation so that the microstructure is somewhat similar to that shown in FIG. 2, but with a higher volume fraction of the fine dispersoid phase 62. If more than 17 percent by weight of boron is present, the structure has more than 90 percent titanium boride present by volume, and the benefits of the presence of the titanium-base metallic composition matrix 46 are reduced and eventually lost.

In FIG. 3, both the fine titanium boride dispersoid phase 62 and the coarse titanium boride dispersoid phase 64 provide strengthening effects, although by different mechanisms. The fine titanium boride dispersoid phase 62 provides dispersoid (i.e., Orowan) strengthening by interacting with dislocations in the titanium-base metallic composition matrix 46. The coarse titanium boride dispersoid phase 64 may provide some dispersoid strengthening, but also provides rule-of-mixtures composite strengthening when present as illustrated in FIG. 3. In the range of 1.5-17 weight percent boron, there may be both fine titanium boride dispersoids 62 and coarse titanium boride dispersoids 64, so that some of each type of strengthening is observed. With an increasing amount of boron present, the volume fraction of titanium boride increases so that it becomes more nearly continuous.

The optional stable-oxide-forming additive element(s) may be present in solid solution, numeral 48, or as one or more unreacted discrete phases 50. Some of the stable-oxide-forming additive element(s) initially in solid solution may have reacted with oxygen initially present in the matrix 46 to form a dispersion of fine oxide dispersoids 52. Some of the stable-oxide-forming additive element(s) initially present as unreacted discrete phase 50 may have reacted with oxygen initially present in the matrix 46 to form a dispersion of coarse oxide dispersoids 54. These stable oxide dispersoids 52 and 54 are distributed substantially uniformly throughout the matrix 46.

Taken together, the titanium boride dispersoid phases 62 or 64 and the oxide dispersoids 52 or 54 provide a great deal of flexibility in controlling the mechanical properties of the final material 40. The relative amounts, sizes, and distributions of the titanium boride dispersoid phases 62 or 64 and the oxide dispersoids 52 or 54 are established largely independently of each other through control of the amounts of boron-containing precursor compound(s) and precursor compound(s) of the stable-oxide-forming additive element(s), and the further processing described next.

Optionally but preferably, there is further processing, step 26, of the consolidated metallic article. In this processing, the article is not melted. Such further processing may include, for example, mechanically forming the consolidated metallic article, step 28, by any operable approach, or heat treating the consolidated metallic article, step 30, by any operable approach. The forming step 28 and/or the heat-treating step 30, where used, are selected according to the nature of the titanium-base metallic composition. Such forming and heat treating are known in the art for each titanium-base metallic composition.

The consolidated material 40 may be oxidized at a temperature greater than room temperature, step 32, particularly where there are strong oxide forming elements present in solution in the titanium-alloy matrix and/or in the form of particles. The oxygen exposure step 32, leading to the types of oxide-related microstructure shown in FIG. 3, may be either during the initial preparation of the metallic article, in a controlled production setting, or during later service exposure at elevated temperature. In either case, the oxygen diffuses inwardly from the surface 42 into the matrix 46. The inwardly diffused oxygen chemically reacts with the oxide-forming additive element(s) that are present near the surface 42 either in solid solution 48 or in discrete phases 50. The result is that few if any unreacted stable-oxide-forming additive elements in solid solution 48 or in discrete phases 50 remain near the surface 42, and instead are all reacted to form, respectively, additional fine oxide dispersoids 52 and coarse oxide dispersoids 54. Consequently, there is a higher concentration of fine-oxide dispersoids 52 in a diffusion-oxidation zone 56 of depth D1 at and just below the surface 42, as compared with the concentration of the fine-oxide dispersoids 52 at greater depths. D1 is typically in the range of from about 0.001 to about 0.003 inches, but may be smaller or larger. Additionally, depending upon the specific oxides formed by the stable-oxide forming elements, there may be formed an oxide surface layer 58 that serves as a diffusion barrier to the diffusion of additional oxygen from the environment 44 into the article 40.

The presence and the nature of the distribution of the oxide dispersoids 52 and 54 has several additional important consequences. The oxide dispersoids 52 and 54 serve to strengthen the matrix 46 by the dispersion-strengthening effect and also to improve the elevated-temperature creep strength of the matrix 46. The oxide dispersoids 52 and 54 may also pin grain boundaries of the matrix 46 to inhibit coarsening of the grain structure during processing and/or elevated temperature exposure. Additionally, in some circumstances the oxide dispersoids 52 and 54 have a higher specific volume than the stable oxide-forming additive elements from which they are produced. This higher specific volume creates a compressive force, indicated by arrow 60, in the matrix 46 near the surface 42. The compressive force 60 inhibits crack formation and growth when the article is loaded in tension or torsion during service, a highly beneficial result.

Figure 4:
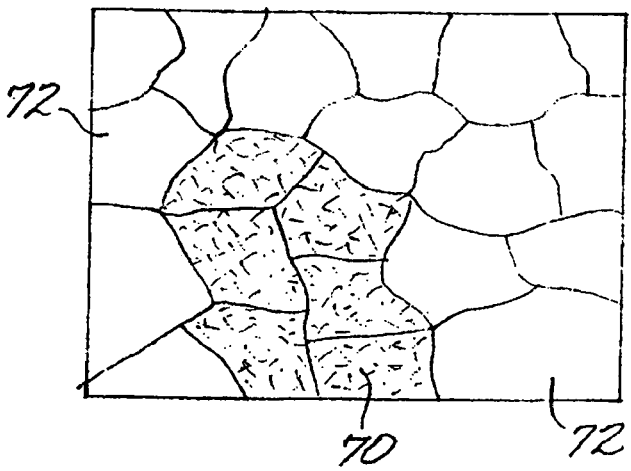
FIG. 4 is an idealized microstructure of a microscopic-level insert in a titanium-base region.
Figure 5:
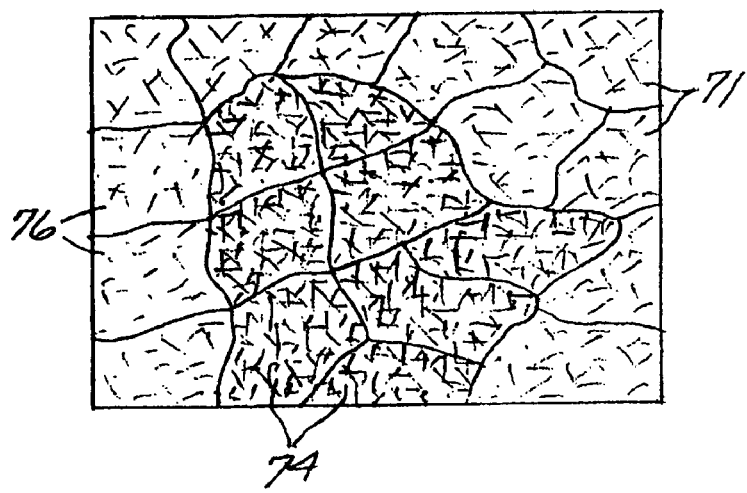
FIG. 5 is an idealized microstructure of two different types of titanium-base metallic compositions with boron combined at a microscopic level in a single structure.
Figure 6:
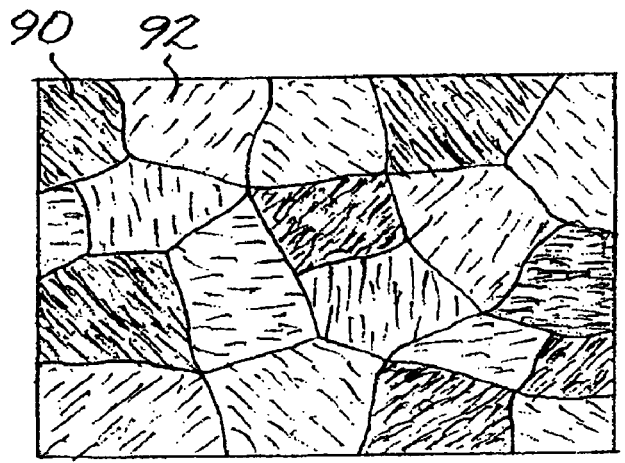
FIG. 6 is an idealized microstructure of a material having high-boron grains and low-boron grains.
Figure 7:
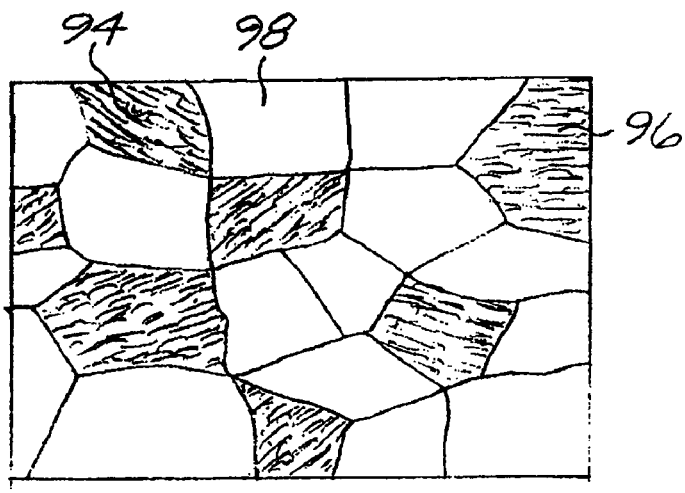
FIG. 7 is an idealized microstructure of a material having high-boron grains and grains with substantially no boron.

One important utilization of the present approach is that the consolidated article may form an insert in relation to a mass of different material. FIGS. 4-7 illustrate several embodiments of this approach. The insert may have a single bulk composition, as shown in FIGS. 4 and 5, or it may comprise a mixture of at least two materials having different bulk compositions, as shown in FIGS. 6 and 7. In the embodiment of FIG. 4, particles of consolidated titanium-base metallic composition having the titanium boride particles therein, numeral 70, form an insert in a metallic mass 72 that is not a consolidated titanium-base metallic composition having titanium boride particles therein. In the embodiment of FIG. 5, particles of a first consolidated titanium-base metallic composition having a first volume fraction of titanium boride particles therein, numeral 74, form an insert in a mass 76 that is a second consolidated titanium-base metallic composition having a second volume fraction of titanium boride particles therein. In the embodiment of FIG. 6, grains 90 having a high volume fraction of titanium boride particles are mixed with grains 92 having a low volume fraction of titanium boride to form an insert. In the embodiment of FIG. 7, grains 94 having a high volume fraction (and/or a low volume fraction 96) of titanium boride are mixed with grains 98 having substantially no titanium boride to form an insert.

Figure 8:
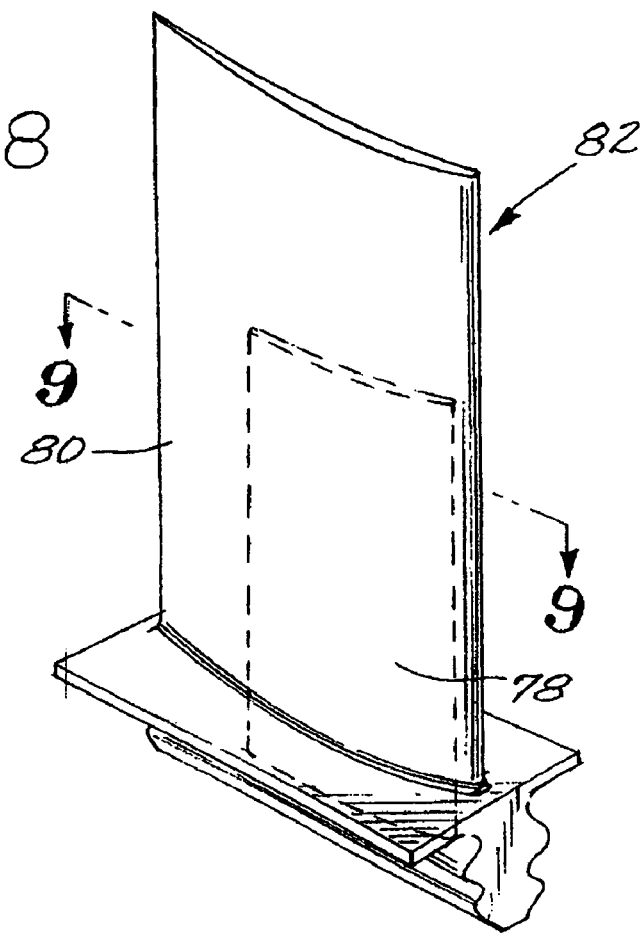
FIG. 8 is a perspective view of a gas turbine component made by the present approach and having a titanium-boron insert.
Figure 9:
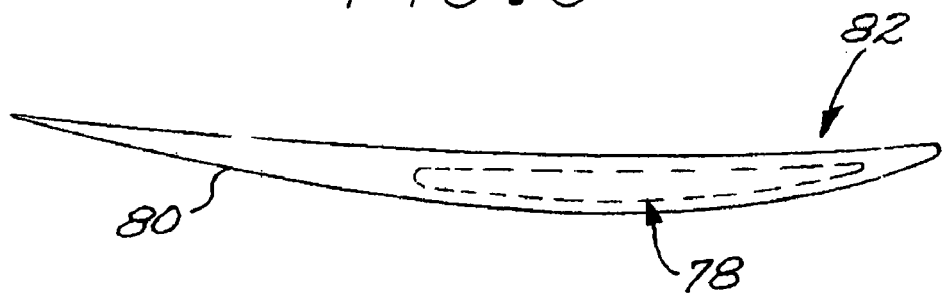
FIG. 9 is a sectional view of the gas turbine component of FIG. 6, taken on line 9-9.

Other compatible arrangements may be used as well. In the embodiment of FIGS. 8-9, an insert 78 of a consolidated titanium-base metallic composition having the titanium boride particles is placed into the non-boride including metallic alloy that forms the balance of an airfoil 80 of a gas turbine engine blade 82. The blade cross-section may have a microstructure similar to that shown in FIG. 4. The insert increases the strength and modulus of the airfoil 80, without being exposed to the combustion gases and without altering the shape of the airfoil 80. Alternatively, the insert may comprise a mixture of at least two materials having different bulk compositions, such as shown in FIGS. 6 and 7. Inserts may be incorporated by any operable approach, such as by making the non-boride portion by casting in place, casting and working, or a non-melting approach, such as diffusion bonding.

Other examples of articles that may be made by the present approach include components of gas turbine engines include vanes, disks, blisks, blings, shafts, cases, engine mounts, stator vanes, seals, and housings. Other articles include automotive parts and biomedical articles. The use of the present invention is not limited to these particular articles, however.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing an article made of constituent elements in constituent-element proportions, comprising the steps of
   furnishing at least one nonmetallic precursor compound, wherein all of the nonmetallic precursor compounds collectively contain the constituent elements in their respective constituent-element proportions, and wherein the constituent elements comprise
      a titanium-base metallic composition, and
      boron present at a level greater than its room-temperature solid solubility limit in the titanium-base metallic composition;
   chemically reducing the precursor compounds to produce a material comprising a titanium-base metallic composition having titanium boride particles therein, without melting the titanium-base metallic composition; and
   consolidating the titanium-base metallic composition having the titanium boride particles therein to produce a consolidated article, without melting the titanium-base metallic composition and without melting the consolidated titanium-base metallic composition.

2. The method of claim 1, wherein the step of furnishing includes the step of
   furnishing the boron constituent element in an amount not greater than that required to form about ninety percent by volume titanium boride in the consolidated material.

3. The method of claim 1, wherein the step of furnishing includes the step of
   furnishing the nonmetallic precursor compounds such that boron is present in the consolidated material in an amount not greater than about 17 weight percent of the consolidated material.

4. The method of claim 1, wherein the step of furnishing includes the step of
   furnishing the nonmetallic precursor compounds such that boron is present in the consolidated material in an amount of from about 0.05 to about 17 weight percent of the consolidated material.

5. The method of claim 1, wherein the step of furnishing includes the step of
   furnishing the nonmetallic precursor compounds such that boron is present in the consolidated material in an amount of from about 0.05 to about 1.5 weight percent of the consolidated material.

6. The method of claim 1, wherein the step of furnishing includes the step of
   furnishing the nonmetallic precursor compounds such that boron is present in the consolidated material in an amount of from about 1.5 to about 17 weight percent of the consolidated material.

7. The method of claim 1, wherein the step of furnishing includes the step of
   furnishing the nonmetallic precursor compounds such that boron is present in the consolidated material in an amount of from about 5 to about 17 weight percent of the consolidated material.

8. The method of claim 1, wherein the step of furnishing includes the step of
   furnishing a nonmetallic precursor compound of a stable-oxide-forming additive element that forms a stable oxide in the titanium-based metallic composition, and wherein at least one additive element is present at a level greater than its room-temperature solid solubility limit in the titanium-base metallic composition, and
   wherein the method includes an additional step, after the step of chemically reducing, of
      oxidizing the metallic composition at a temperature greater than room temperature.

9. The method of claim 1, wherein the step of furnishing includes the step of
   furnishing a nonmetallic precursor compound of an additive element selected from the group consisting of magnesium, calcium, scandium, yttrium, lanthanum, cerium, praseodymium, neodymium, promethium, samarium, europium, gadolinium, terbium, dysprosium, holmium, erbium, thulium, ytterbium, and lutetium, and mixtures thereof, and wherein at least one additive element is present at a level greater than its room-temperature solid solubility limit in the titanium-base metallic composition.

10. The method of claim 1, wherein the step of furnishing includes the step of
    furnishing a compressed mass of the at least one nonmetallic precursor compound.

11. The method of claim 1, wherein the step of furnishing includes the step of
    furnishing at least one nonmetallic precursor compound comprising metallic-halide precursor compounds.

12. The method of claim 1, wherein the step of furnishing includes the step of
    furnishing at least one nonmetallic precursor compound comprising metallic-oxide precursor compounds.

13. The method of claim 1, wherein the step of chemically reducing includes the step of
    producing a sponge of the material comprising the titanium-base metallic composition having titanium boride particles therein.

14. The method of claim 1, wherein the step of chemically reducing includes the step of
    producing particles of the material comprising the titanium-base metallic composition having titanium boride particles therein.

15. The method of claim 1, wherein the step of chemically reducing includes the step of
    chemically reducing the mixture of nonmetallic precursor compounds by vapor-phase reduction.

16. The method of claim 1, wherein the step of chemically reducing includes the step of
    chemically reducing the compound mixture by solid-phase reduction.

17. The method of claim 1, wherein the step of furnishing or the step of chemically reducing includes the step of
    adding an other additive constituent.

18. The method of claim 1, wherein the step of consolidating includes the step of
    consolidating the titanium-base metallic composition having the titanium boride particles using a technique selected from the group consisting of hot isostatic pressing, forging, pressing and sintering, and direct powder consolidation extrusion.

19. The method of claim 1, including an additional step, after the step of consolidating, of forming the consolidated article.

20. The method of claim 1 wherein the consolidated article is applied as an insert to a second article.

21. The method of claim 20 wherein the consolidated article is produced by the additional step of mixing together a plurality of bulk compositions prior to the consolidation step.

22. A method for producing an article made of constituent elements in constituent-element proportions, comprising the steps of furnishing at least one nonmetallic precursor compound, wherein all of the nonmetallic precursor compounds collectively contain the constituent elements in their respective constituent-element proportions, and wherein the constituent elements comprise a titanium-base metallic composition, and boron present at a level of from about 0.05 to 17 percent by weight of the article, and a stable-oxide-forming additive element that forms a stable oxide in the titanium-based metallic composition, and wherein at least one additive element is present at a level greater than its room-temperature solid solubility limit in the titanium-base metallic composition; and chemically reducing the precursor compounds to produce a material comprising a titanium-base metallic composition having titanium boride particles therein, without melting the titanium-base metallic composition; and consolidating the titanium-base metallic composition having the titanium boride particles therein to produce the consolidated article, without melting the titanium-base metallic composition and without melting the consolidated titanium-base metallic composition.

23. The method of claim 22, wherein the step of furnishing includes the step of providing the nonmetallic precursor compound of the stable-oxide-forming additive element selected from the group consisting of magnesium, calcium, scandium, yttrium, lanthanum, cerium, praseodymium, neodymium, promethium, samarium, europium, gadolinium, terbium, dysprosium, holmium, erbium, thulium, ytterbium, and lutetium, and mixtures thereof.

24. The method of claim 22, including an additional step, after the step of chemically reducing, of oxidizing the titanium-base metallic composition at a temperature greater than room temperature.

25. The method of claim 22, wherein the titanium-base metallic composition has from zero to about 0.5 weight percent oxygen in solid solution.

* * * * *